United States Patent
Friese et al.

(10) Patent No.: US 11,020,784 B2
(45) Date of Patent: Jun. 1, 2021

(54) METHOD FOR PRODUCING A MOULDED BODY COMPRISING A HUB AND DEVICE FOR CARRYING OUT THE METHOD

(71) Applicants: WF-MASCHINENBAU U. BLECHFORMTECHNIK GMBH & CO. KG., Sendenhorst (DE); THYSSENKRUPP STEEL EUROPE AG, Duisburg (DE)

(72) Inventors: Udo Friese, Ahlen (DE); Thomas Großerüschkamp, Duisburg (DE)

(73) Assignees: WF-MASCHINENBAU U. BLECHFORMTECHNIK GMBH & CO. KG, Sendenhorst (DE); THYSSENKRUPP STEEL EUROPE AG, Duisburg (DE)

( * ) Notice: Subject to any disclaimer, the term of this patent is extended or adjusted under 35 U.S.C. 154(b) by 185 days.

(21) Appl. No.: 16/089,604

(22) PCT Filed: Mar. 27, 2017

(86) PCT No.: PCT/EP2017/057170
§ 371 (c)(1),
(2) Date: Sep. 28, 2018

(87) PCT Pub. No.: WO2017/167678
PCT Pub. Date: Oct. 5, 2017

(65) Prior Publication Data
US 2019/0388949 A1    Dec. 26, 2019

(30) Foreign Application Priority Data

Mar. 30, 2016   (DE) ............. 10 2016 105 771.1

(51) Int. Cl.
*B21D 24/14*      (2006.01)
*B21D 22/16*      (2006.01)
*B21D 53/12*      (2006.01)

(52) U.S. Cl.
CPC ............ *B21D 22/16* (2013.01); *B21D 53/12* (2013.01)

(58) Field of Classification Search
CPC   B21D 53/12; B21D 22/14–185; B21D 53/10; B23P 2700/11; B21K 1/765;
(Continued)

(56) References Cited

U.S. PATENT DOCUMENTS 2,086,488 A * 7/1937 Batie ................ B21D 53/34
72/39
3,783,665 A * 1/1974 Ashizawa ........... B21D 22/185
72/81

(Continued)

FOREIGN PATENT DOCUMENTS

DE   102013101555 B3 *  5/2014  ............ B21H 7/00
DE   102013101555 B3    5/2014
(Continued)

OTHER PUBLICATIONS

California Northbridge University, "Experiment 5—Cold Work, Recovery, Recrystallization and Grain Growth", Aug. 7, 2010, California Northbridge University, https://web.archive.org/web/20100807145241/http://www.csun.edu/~bavarian/Courses/MSE%20227/Labs/5-Cold_Working_Brass.pdf (Year: 2010).*
International Search Report dated Jul. 11, 2017 in related International Application No. PCT/EP2017/057170.
Written Opinion dated Jul. 11, 2017 in related International Application No. PCT/EP2017/057170.

*Primary Examiner* — Adam J Eiseman
*Assistant Examiner* — Dylan Schommer
(74) *Attorney, Agent, or Firm* — Patent Portfolio Builders PLLC

(57) ABSTRACT

A method for producing a molded body of particularly steel, and including a hub and a bell-shaped lower part axially connected thereto, in which an inner contour is made in the lower part by non-cutting forming in a convex region. The inner contour includes of ball tracks and cage paths that are (Continued)

concave in the axial direction and arranged in a peripherally alternating manner, for receiving rolling bodies, the cage paths being shallower than the ball tracks. The hub is formed from a rotating round blank and reducing the thickness thereof using at least one pressure roller. The flat region of the round blank that radially connects to the hub is pressed onto contour segments of a rotating first inner contour tool, partially forming the inner contour using at least one axially and radially moving pressure roller to form a preform of the lower part. The fixed preform is pressed against contour segments of a second inner contour tool by a die of partial dies, fully forming the cage paths and ball tracks.

15 Claims, 9 Drawing Sheets

(58) Field of Classification Search
CPC ... B21K 1/762; B21J 5/02; B21J 13/02; B21J 13/025
USPC ............... 72/83, 82, 353.4, 353.6, 354.2
See application file for complete search history.

(56) References Cited

U.S. PATENT DOCUMENTS

| | | | | |
|---|---|---|---|---|
| 4,843,864 | A | * 7/1989 | Welschof | ............... B21K 1/762 72/353.4 |
| 5,970,776 | A | * 10/1999 | Iijima | ................... B21D 22/06 72/353.4 |
| 7,213,434 | B2 | * 5/2007 | Sato | ....................... B21C 23/20 72/354.8 |
| 2010/0011830 | A1 | * 1/2010 | Huetter | ................. B21D 22/16 72/206 |
| 2013/0152652 | A1 | * 6/2013 | Allwood | ................ B21D 22/18 72/85 |
| 2016/0089708 | A1 |  3/2016 | Gövert et al. | |

FOREIGN PATENT DOCUMENTS

| | | | | |
|---|---|---|---|---|
| DE | 102013106268 A1 | * 12/2014 | ............ B21D 53/88 |
| DE | 102013106268 A1 |  12/2014 | |
| EP | 0358784 A1 |  3/1990 | |
| JP | 02025237 A | * 1/1990 | ............ B21K 1/765 |

* cited by examiner

METHOD FOR PRODUCING A MOULDED BODY COMPRISING A HUB AND DEVICE FOR CARRYING OUT THE METHOD

BACKGROUND AND SUMMARY OF THE INVENTION

Exemplary embodiments of the invention relate to a method for producing a molded body having a hub and an axially adjoining, bell-shaped lower part.

Such molded bodies are used in particular as axle pins or pivot pins and are part of a connecting joint to transmit torques to components disposed mutually angularly to each other, especially shafts.

German patent document DE 10 2013 101 555 B3 disclose producing the molded body consisting of metal, in particular steel, from a tube as a semi-finished product, forming an integrally formed hub and an adjoining bell-shaped lower part, with an inner contour.

This inner contour consists of circumferentially alternately arranged ball raceways and cage raceways, which are arched concavely in the axial direction of the molded body, wherein the ball raceways are formed deeper than the cage raceways.

The introduction of the inner contour in a bulbous region of the lower part is characteristic in this case, which lower part is constricted to some extent on its side opposite the hub. That is, the inside diameter in this region is smaller than the diameter at the apex of the bulbous region. At this constriction, i.e., in continuation of the bulbous region, a conically widening section adjoins as an apron, which deviating from it can also be aligned radially outwards.

Although the use of a round blank as a semi-finished product is mentioned in the aforementioned German patent document, further details cannot be found there.

In the known method, the bell-shaped lower part is produced by pressing by means of a suitable pressing tool or by pressing with the aid of a pressure roller, while the subsequent inner contouring is effected by an outwardly contoured pressure roller, with which the bulbous region of the lower part is pressed against a multi-part inner contour tool having contour segments.

However, a desired dimensional accuracy required for the purpose in the known method can only be achieved with a considerable manufacturing effort, which is particularly disadvantageous in that such molded bodies are produced as series parts in large quantities.

U.S. Pat. No. 5,970,776 A discloses the production of a bell-shaped molded body with inner contours shaped in the manner of ball and cage raceways, which are formed by the interaction of inner contour segments with outer pressure pieces.

By means of the device provided for this purpose, however, only one molded part can be produced whose wall, in relation to the size of the bulbous region, in particular of the diameter, is very small. In that regard, this literature is not suitable to provide evidence of a molded body, which in terms of its loading capacity can be used as axle pin or pivot pin, regardless of that an essential configuration, namely the molded hub, is not provided.

Exemplary embodiments are directed to a method for producing a molded body having a hub and an axially adjoining, bell-shaped lower part so that the dimensional accuracy of the molded body and its usability are improved.

The essence of the invention is to bring, by means of at least one pressure roller, both the hub and the bell-shaped lower part into a preform in which the inner contours, i.e., the cage and ball raceways, are partially formed with respect to their depth.

Thus, the possibility of centering and securing anti-rotation of the preform for subsequent finishing is achieved, in which then the inner contour is brought to its final dimensions.

While in the preforming of the lower part by means of the at least one pressure roller the outer surface of the lower part remains with a smooth surface, the outer shell surface is similarly formed according to the progression of the curvature of the inner contour according to the invention by means of a forming die consisting of die parts, wherein the concave curvatures both in the axial direction as well as the ball raceways and the cage raceways transversely thereto are represented again as convex curvatures on the outer surface.

According to an advantageous embodiment of the method according to the invention, the material is heated to form the hub and/or for the production of the preform and/or the final molded body preferably to a temperature of about 400° to 1000°, preferably about 600° C. to 700° C.

As a result of the so-called forced centering of the preform in the further processing to form a final molded body, dimensionally accurate production of the inner contour is achieved, which equally affects the predetermined pitch, i.e., the arrangement of rolling ball raceways and the cage raceways.

Moreover, compared to the prior art, a significantly faster production of the molded body is possible, wherein the hub may be formed either as a hollow or solid body.

Furthermore, as a result of the spin forming by means of the pressure rollers for the completion of the preform, lower parts with relatively thick walls in relation to the diameter of the lower part are possible, so that in principle a load-optimized molded body can be provided in principle.

A device for carrying out the method comprises, for the formation of the preform, a first, rotatable inner contour tool, with radially movable, separate contour segments which are each associated with a ball raceway and a cage raceway and which lie against each other without a gap in the functional position.

Functionally, the contour segments for forming the preform are identical to those for the formation of the final molded body and only differ in their dimensional configuration.

Except for the contour segments, the structure of the device is comparable for both applications. In contrast to the first, rotatable contour tool, however, the second inner contour tool is held in a rotation-proof manner.

To remove the lower part, whether as a preform or as a final molded body of the contour tool, the contour segments, as mentioned, are movable radially inwardly, i.e., to the axis of rotation, namely by means of a positive guide. For this purpose, the contour segments are held on a cone ring, which tapers towards the hub and on the outside has sliding surfaces on which the contour segments are supported.

This cone ring is axially relatively displaceable to the contour segments, wherein each contour segment has an undercut longitudinal groove in which a cap screw or a sliding block connected to the cone ring is guided.

For an obstruction-free radial movement of the adjoining contour segments associated with the cage raceways and the ball raceways, in particular of the second contour tool, the guide surfaces of the cone ring, which abut the contour segments for the ball raceways, are flatter in their inclination than the guide surfaces on which the contour segments associated with the cage raceways are supported.

The contour segments are so far radially movable towards the axis of rotation of the molded body that the lower part, whether as a preform or as a final molded body, can travel over the contour segments even with the smallest clear diameter in the part limiting the bulbous region, which adjoins an outwardly facing conical apron.

Moreover, the device is distinguished by its high stability and concentricity due to the formation of the upper end of the guide column near the hub, so that the forces occurring during the deformation of the round blank to a finished molded body can be easily absorbed.

BRIEF DESCRIPTION OF THE DRAWING FIGURES

The method according to the invention and exemplary embodiments of a device according to the invention are described below with reference to the attached drawings, wherein.

DETAILED DESCRIPTION

Figure 1:
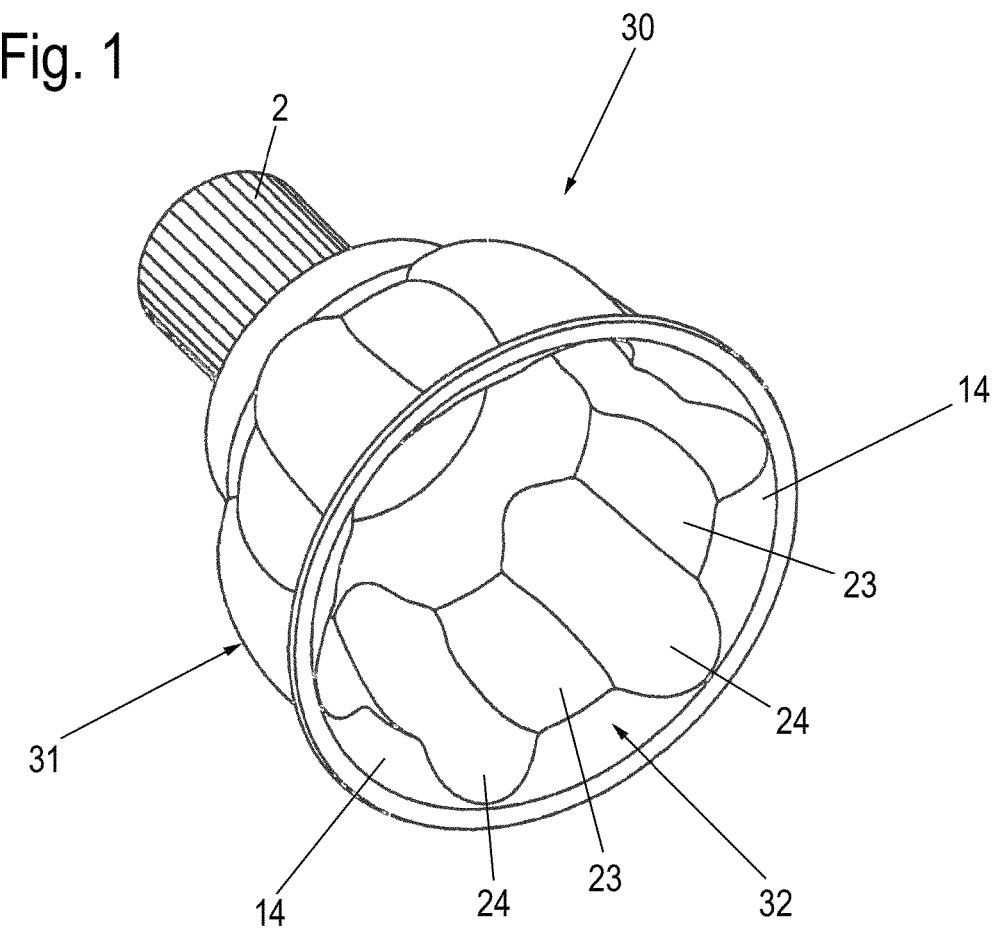
FIG. 1 shows a molded body in a perspective view.

FIG. 1 shows a substantially rotationally symmetrical molded body 30, having a hub 2 and a lower part 31 adjoining the hub and being integrally formed thereon without cutting.

Such a molded body 30 already known from the prior art has in its lower part 31 an inner contour 32, consisting of ball raceways 24, between each of which a cage raceway 23 is formed, wherein the ball raceways 24 and the cage raceways 23 are distributed evenly over the circumference of the lower part 31.

The cage raceways 23 and the ball raceways 24 are curved in a concave manner in the axial direction, with respect to an axis X, as well as transverse thereto. The ball raceways 24 visibly extend to a lower end region of the lower part opposite the hub 2, while the cage raceways 23 extend shorter than the ball raceways 24 into the region of an apron 14, which in the example, as shown in particular in FIG. 2, expands conically to the outside. It is also conceivable to form the apron 14 up to a radial orientation.

Figure 2:
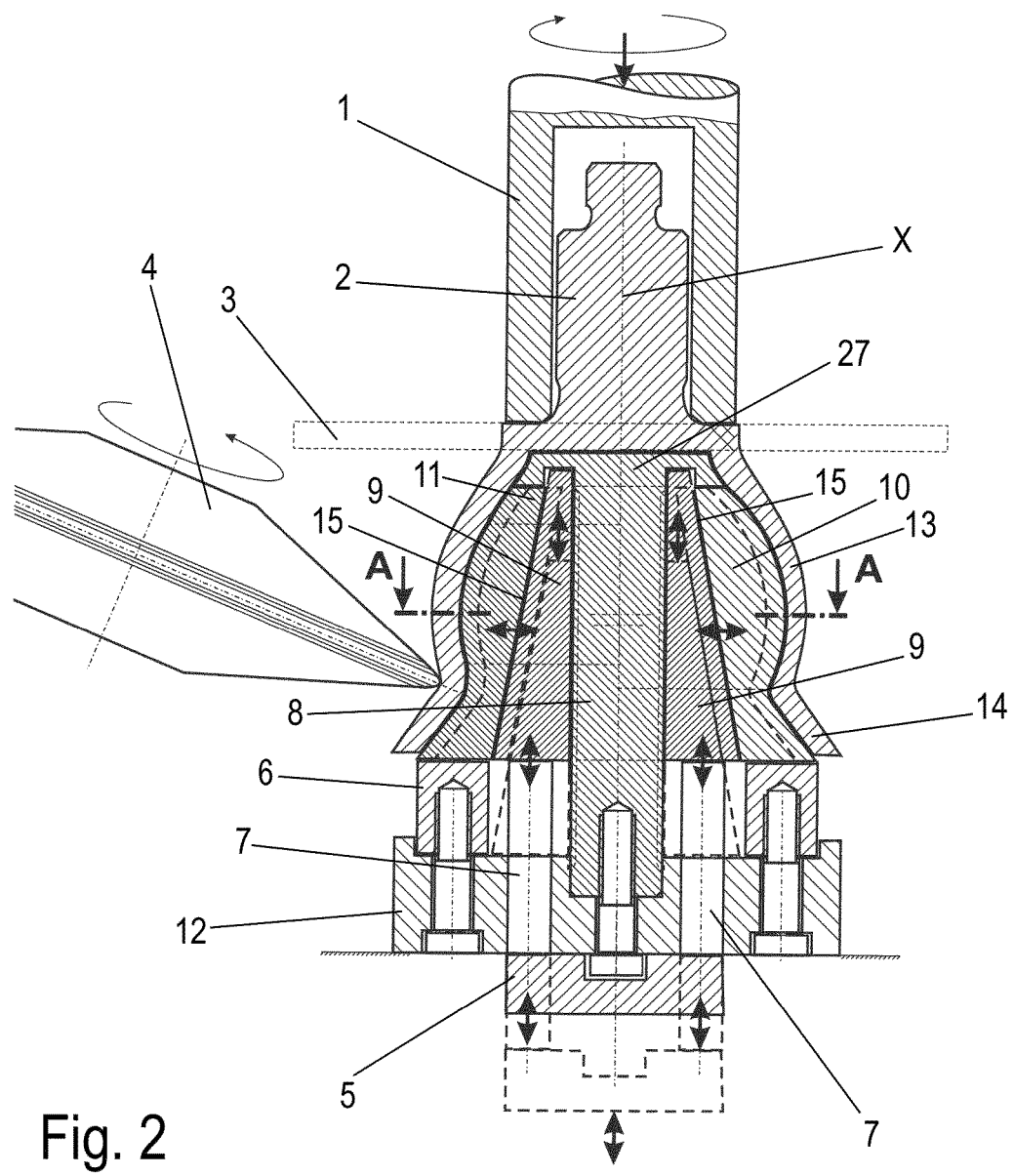
FIG. 2 shows a longitudinal section through a first embodiment variant of a device according to the invention for forming a preform according to the line B-B in FIG. 3.

In FIG. 2, it can be seen that from a rotating, preferably flat, round blank 3, which is shown with a dashed line and is made of metal a hub 2, is integrally formed by means of at least one rotatable pressure roller, which is immersed in the material of the round blank, and then moved radially from outside to inside, this occurring with a reduction in thickness.

For further processing, i.e., for forming the lower part 31, first as a preform 13, the round blank 3 is pressed by a presetter 1 as a clamping element against an axially fixed, guide column 8 held in a base plate 12, which simultaneously performs the centering function. In this case, the guide column 8 comprises at its end facing the hub a support plate 27 on which the round blank 3 is supported.

Figure 3:
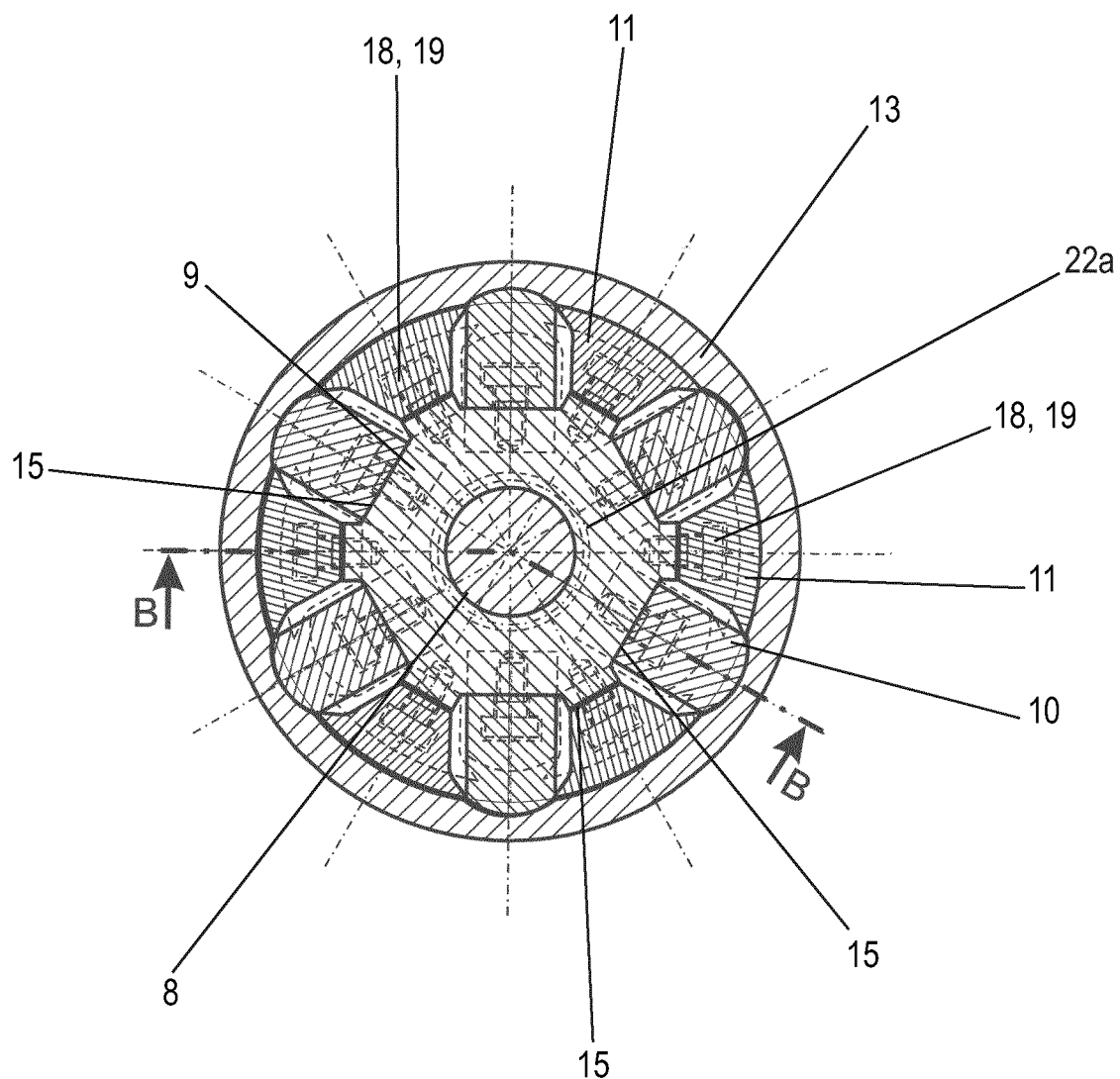
FIG. 3 shows a cross-section through the device according to FIG. 2 along the line A-A.

The guide column 8 is part of a first inner contour tool, which furthermore has a cone ring 9, which is held against rotation, but axially displaceable on the guide column 8. The security against rotation is preferably carried out, as shown in FIG. 3, by a spline 22A, also referred to as spline connection, between guide column 8 and cone ring 9 in order to enable the absorbance of the high torque occurring during this step.

By means of at least one pressure roller 4, the plan area of the round blank 3 radially adjoining the hub 2 is pressed against the first inner contour tool, i.e., against contour segments 10, 11 of the first inner contour tool, wherein the pressure roller 4 is advanced radially and axially. The first inner contour tool rotates with the round blank 3 in this case.

As a result, a preform 13 is provided whose outer jacket surface is contoured only in the axial direction, as shown according to the illustration in FIG. 2. On the inside, however, cage raceways 23 and ball raceways 24 are preformed by the contour segments 10, 11, i.e., only in its axial contour progression, but not with respect to their width and depth corresponding to the final molded body, which is shown particularly clearly in FIG. 3.

After completion of the use of the pressure roller 4, which is otherwise pressed against the rotating round blank 3 or the preform 13, the cone ring 9 is moved downwards in the arrow direction, into a position corresponding to the dashed illustration, wherein the cone ring 9 is connected to a pressure plate 5 via axially movable pressure dies 7.

The guide column 8, however, is fixed in a base plate 12, which is held stationary and on which a support ring 6 is fixed, which serves as an abutment for the contour segments 10, 11 when the cone ring 9 is pulled downwards, i.e., in the direction facing away from the hub 2.

As already mentioned, with the axial displacement of the cone ring 9 into a final shaping position, the contour segments 10, 11 are moved radially in the direction of the guide column 8, for which purpose a sliding block 18 is fixed in each case in guide surfaces 27 of the cone ring 9, on which the contour segments 10, 11 are displaceably mounted, the sliding block engaging in a slotted guide 19 of the respective contour segment 10, 11. This sliding block 18 may, for example, consist of a cap screw.

As a result of the radial displacement of the contour segments 10, 11 into one position shown in FIG. 2 in dashed lines, the preform 13 is exposed to such an extent relative to the contour tool that it is easily removeable.

Figure 4:
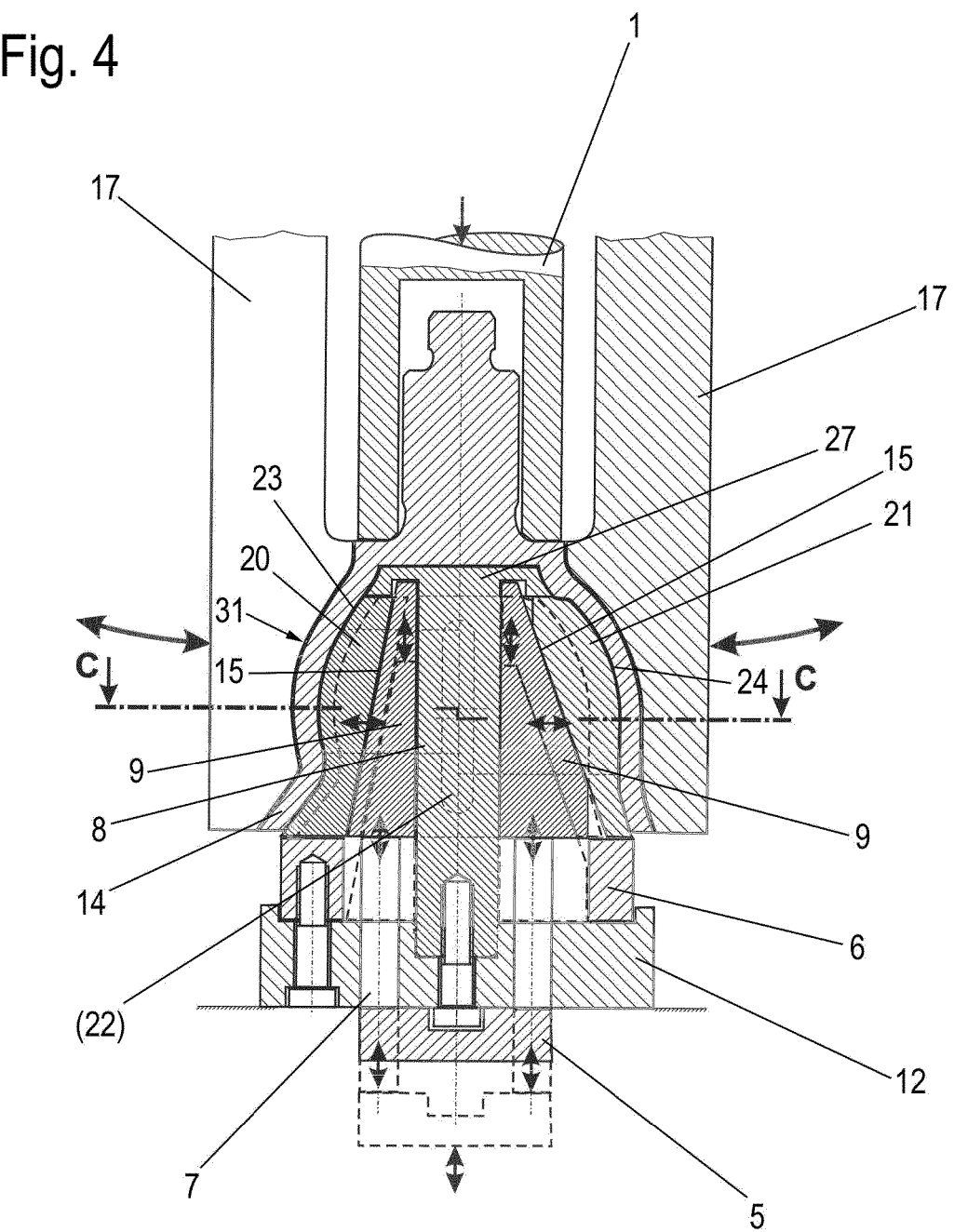
FIG. 4 shows a longitudinal section through the device for forming the final molded body, corresponding to the line B-B.
Figure 5:
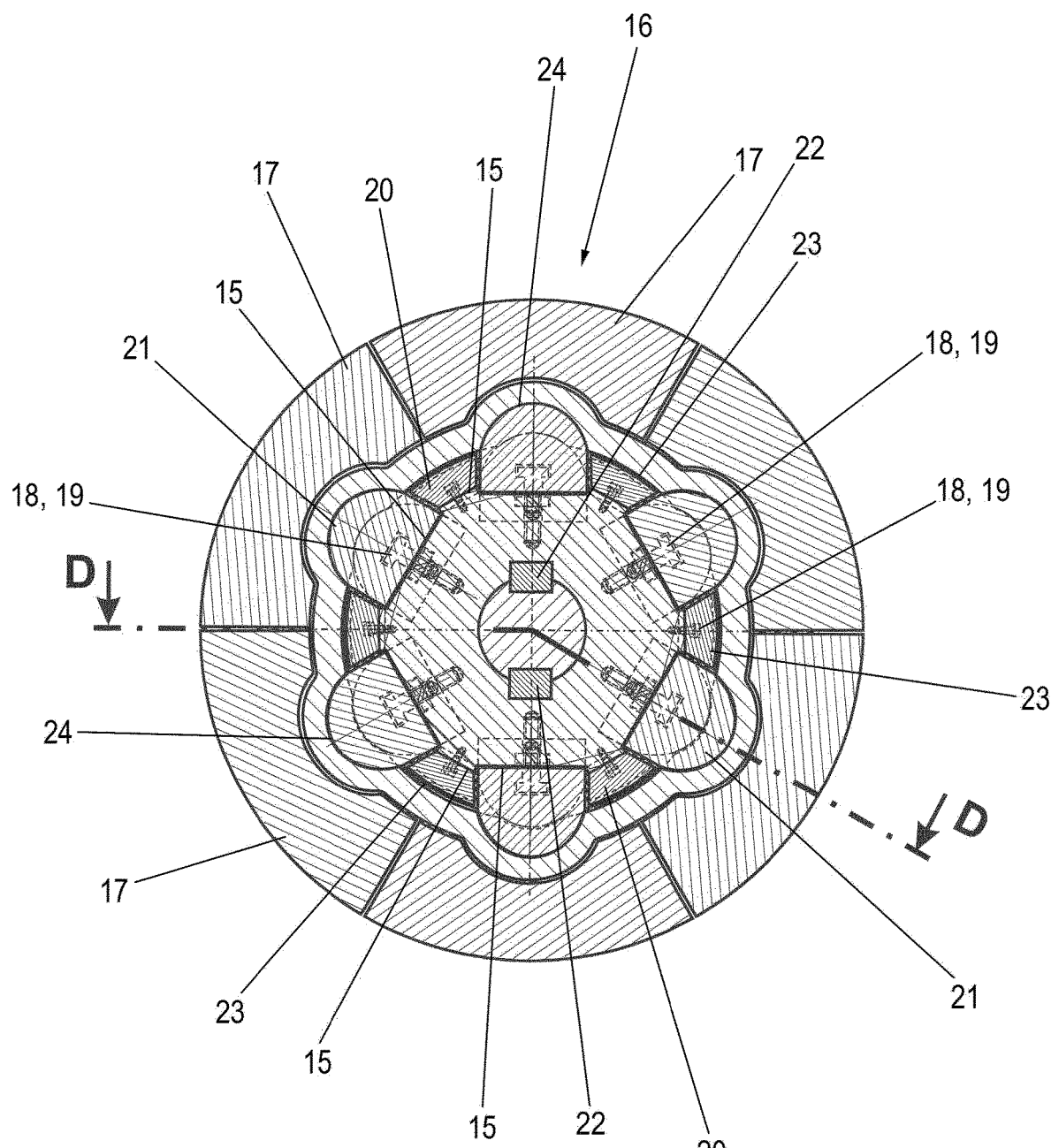
FIG. 5 shows a cross-section through the device according to the line C-C in FIG. 4.

In a subsequent method step, the preform 13 is further processed into a final molded body, namely the lower part 30. This process step is shown in FIGS. 4 and 5.

In principle, the structure of the second inner contour tool is comparable to that of the first inner contour tool for forming the preform 13. In this case, however, contour segments 20, 21 are used, which differ in dimension from the contour segments 10,11 of the first inner contour tool, namely such that ball raceways 24 and cage raceways 23 are given their final shape.

For their embossment, radially advanceable die parts 17 are provided on the outer jacket surface of the preform, which are a segmental component of a die 16 and which are pressed against the outer jacket surface of the now non-rotating preform 13, wherein the die parts 17, of which each is assigned a ball raceway 24, have a concave shape adapted to the convex shape of the contour segment 21, so that there is a corresponding outer contour of the final molded body forming the lower part 31.

For placing the preform 13 on the second inner contour tool, the contour segments 20, 21 are held in a non-functional position, i.e., the cone ring 9 is brought into an end position that is displaced relative to the guide column 8 in the direction of the base plate, in combination with forced radial movement of the contour segments 20, 21 inwardly to the guide column 8.

After placing the preform 13 on the guide column 8 formed at the end side as a support plate 27, the cone ring 9 is displaced in the direction of the hub 2 or the integrally attached support plate 27 of the guide column 8 and as a result of the cone surfaces acting as a wedge, the contour segments 20, 21 are moved to an end position in which these rest against each other in a gap-free or almost gap-free manner.

To prevent rotation of the cone ring 9 with the guide column 8, as clearly shown in FIG. 5, feather keys 22 are provided that engage in the guide column 8 and the cone ring 9.

By pressing the die parts 17, corresponding to the direction of the arrow in FIG. 4, the ball raceways 24 and the cage raceways 23 are formed.

FIGS. 6 to 9 show an alternative embodiment variant of a device according to the invention. In contrast to the device according to FIGS. 2 to 5, in the case of the first inner contouring tool, the contour segment 10' for forming the ball raceways 24 is formed integrally with the cone ring 9.

Figure 6:
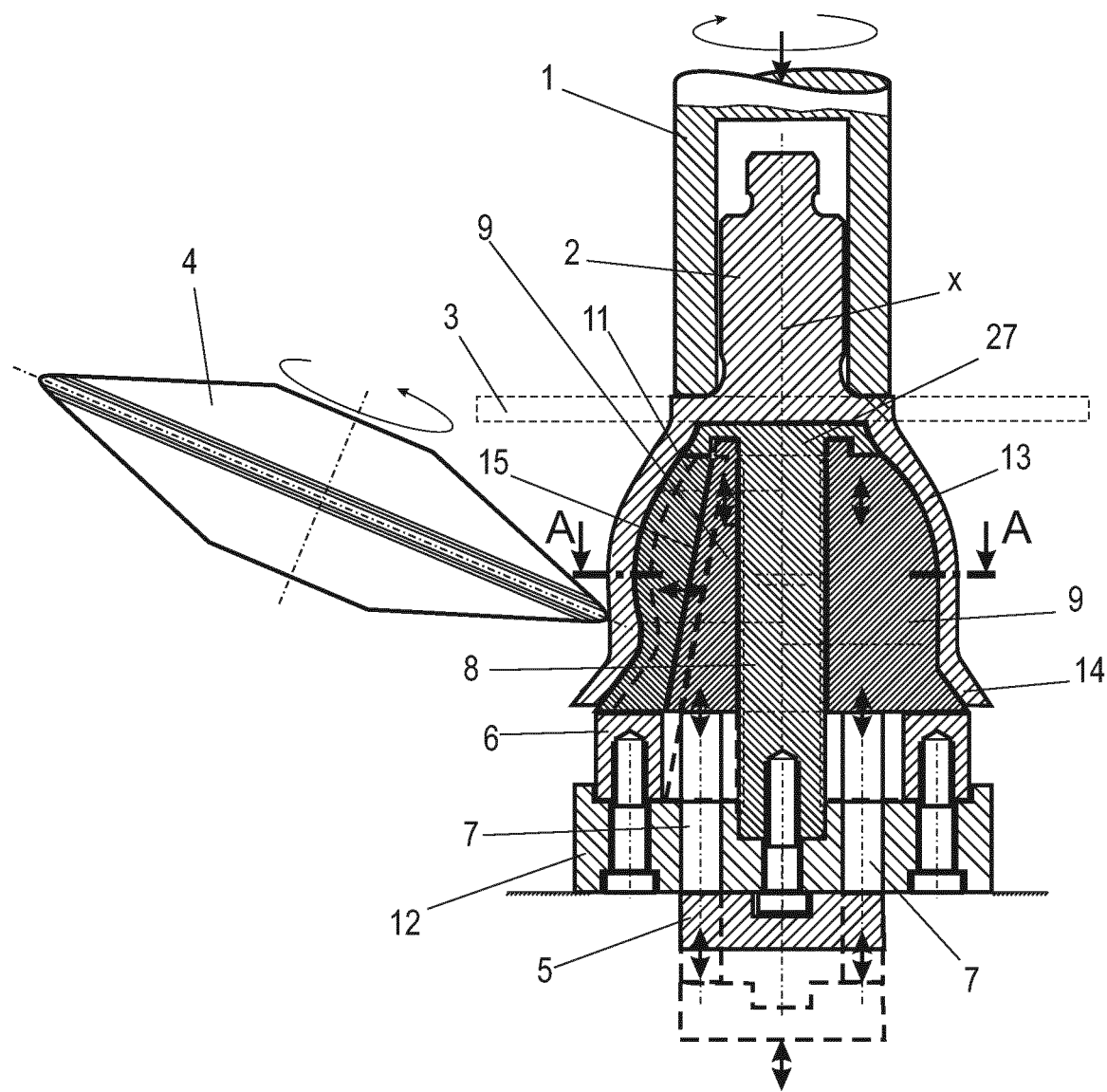
FIG. 6 shows a longitudinal section through a second embodiment variant of a device according to the invention for forming a preform according to the line B-B in FIG. 7.
Figure 7:
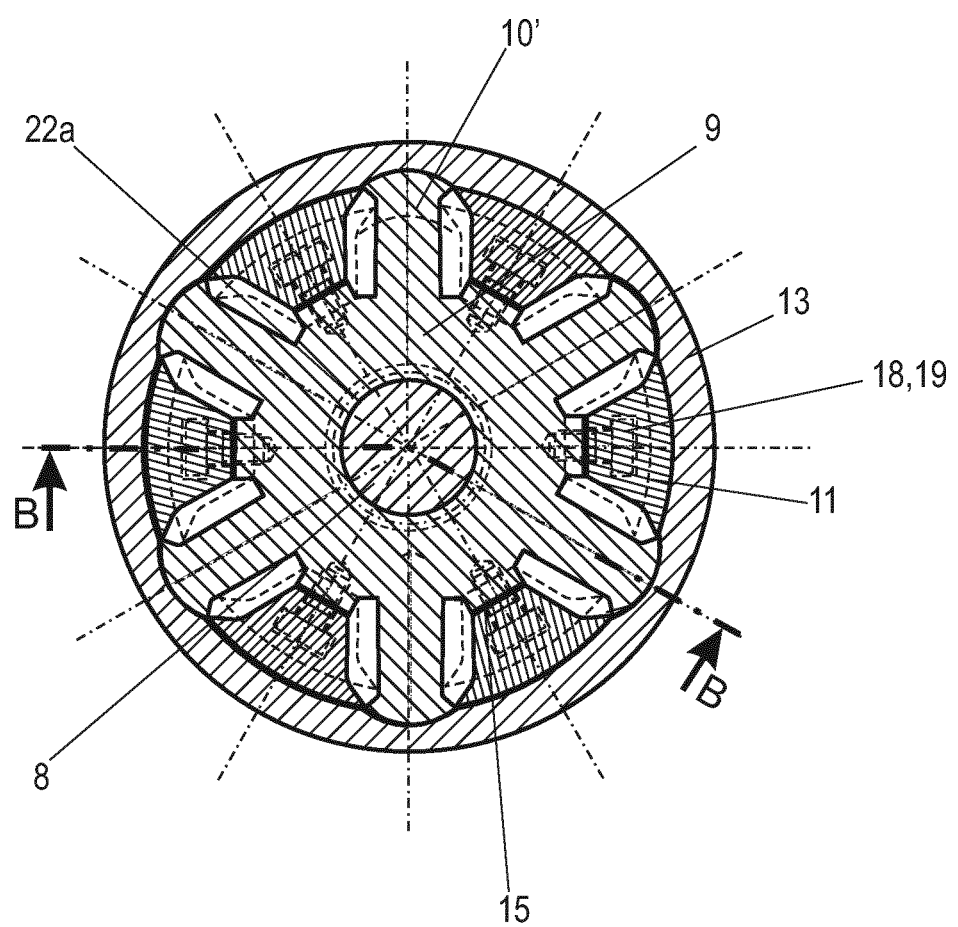
FIG. 7 shows a cross-section through the device of FIG. 6 according to the line A-A.
Figure 8:
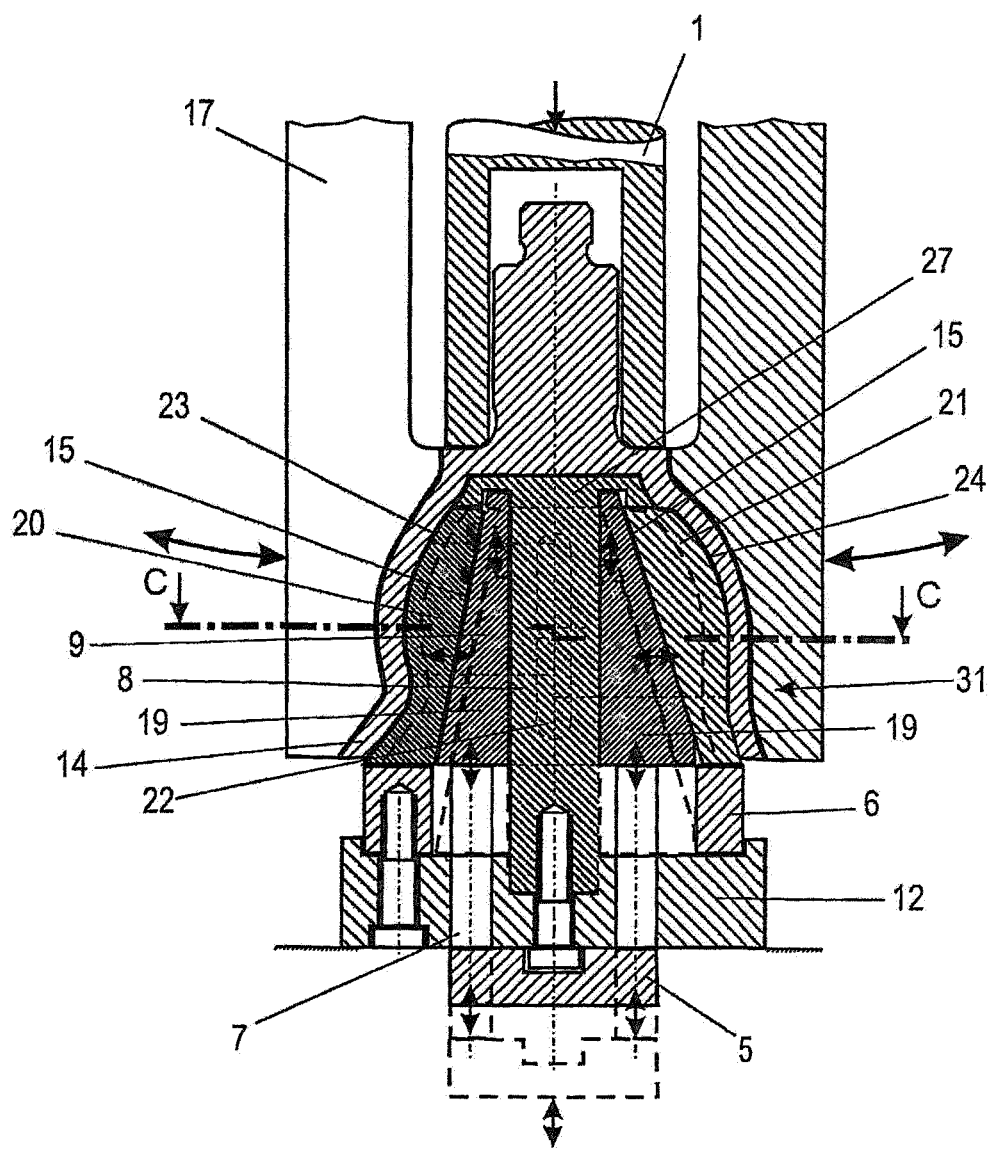
FIG. 8 shows a longitudinal section through the second embodiment variant of the device for forming the final molded body, corresponding to the line B-B in FIG. 9.
Figure 9:
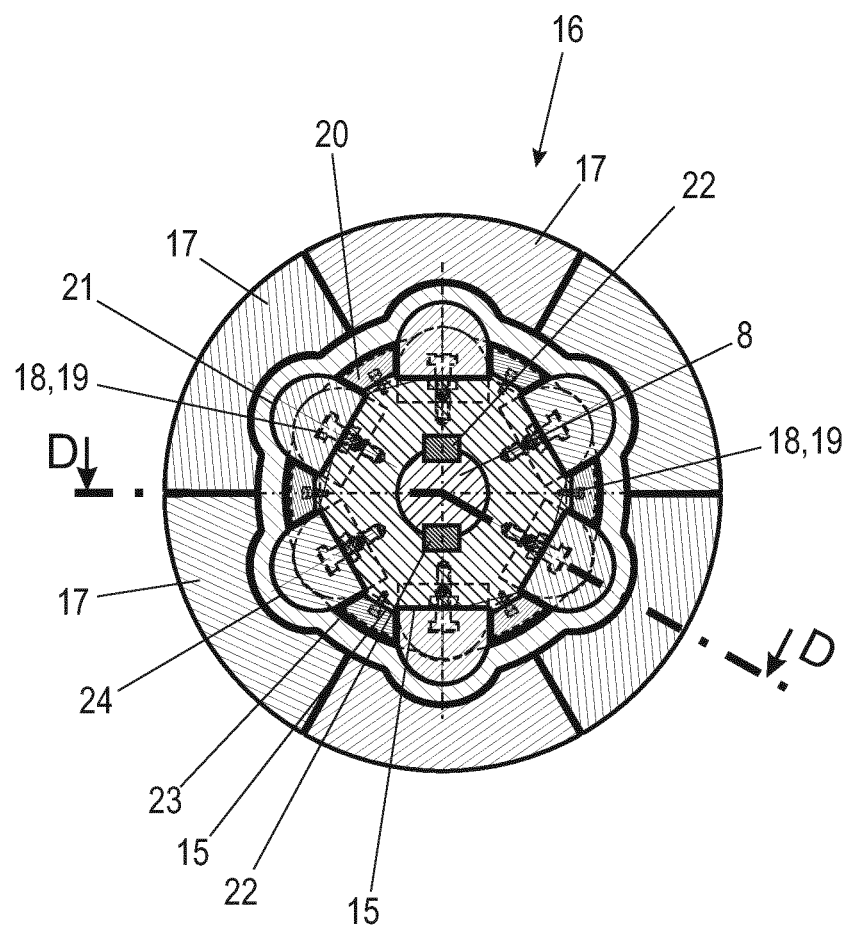
FIG. 9 shows a cross-section through the device according to the line C-C in FIG. 8.

As can further be seen in FIG. 6, in this variant as well, the plan area of the round blank 3 radially adjoining the hub 2 is pressed against the first inner contour tool, i.e., against contour segments 10', 11 of the first inner contour tool, wherein the pressure roller 4 is advanced radially and axially. The shape of the contour segments 10' here is such that the radius of the jacket surface of the contour segments 10' never increases upwardly, i.e., counter to the direction of the final shape, but is formed to decrease or remain upwardly constant, so that after completed pressing of the round blank 3 against the first inner contour tool the preform 13 can be removed easily relative to the contour tool.

As a result, a preform 13 is created whose outer jacket surface is contoured only in the axial direction, corresponding to the illustration in FIG. 2.

For simplified processing, in particular with regard to the material deformation, the round blank or the preform, as already stated, can be heated. To increase the service life of the tools involved in the deformation, they can be cooled, wherein corresponding cooling channels can be provided.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Presetter
2 Hub
3 Round blank
4 Pressure roller
5 Pressure plate
6 Support ring
7 Pressure die
8 Guide column
9 Cone ring
10 Contour segment
10' Contour segment
11 Contour segment
12 Base plate
13 Preform
14 Apron
15 Guide surface
16 Die
17 Die part
18 Sliding block
19 Longitudinal groove
20 Contour segment
21 Contour segment
22 Feather keys
22A Spline connection
23 Cage raceway
24 Ball raceway
27 Support and centering plate
30 Molded body
31 Lower part
32 Inner contour

The invention claimed is:

1. A method for producing a steel molded body having a hub and an axially adjacent bell-shaped lower part, wherein an inner contour is introduced into the bell-shaped lower part by non-cutting shaping in a bulbous curved area, consisting of circumferentially alternately arranged cage raceways that are concave in the axial direction and ball raceways for receiving rolling elements, wherein a depth of the cage raceways is lower than that of the ball raceways, the method comprising the following successively performed steps:

pressing, by at least one axially and radially moveable rotatable pressure roller, a plan area of a round blank radially adjoining the hub onto moveable contour segments, having convex portions, of a rotating first inner contour tool to form a preform of the lower part having partially formed ball raceways and cage raceways on an inner contour of the perform; and pressing the stationary preform against moveable contour segments of a second inner contour tool by a die consisting of partial dies, to fully form the cage raceways and ball raceways, wherein the second inner contour tool is fixed and the moveable contour segments of the second inner contour tool have convex portions for the fully forming of the cage raceways and the ball raceways.

2. The method of claim 1, wherein the contour segments are moved after the partial formation and after the full formation of the respective inner contour radially towards the axis outside an overlap area with the lower part.

3. The method of claim 1, wherein the round blank for integrally forming the hub, the round blank for forming the preform, and/or the preform for the final formation of the lower part is heated to a temperature of 400°-600° C.

4. A device for producing a steel molded body having a hub and an axially adjacent bell-shaped lower part, wherein an inner contour is introduced into the bell-shaped lower part by non-cutting shaping in a bulbous curved area, consisting of circumferentially alternately arranged cage raceways that are concave in the axial direction and ball raceways for receiving rolling elements, wherein a depth of the cage raceways is lower than that of the ball raceways, the device comprising:
- a first rotatable inner and a second fixed inner contour tool, which each comprise separate, radially forcibly movable contour segments for the embossment of the ball raceways and the cage raceways, and the first contour tool is assigned at least one radially and axially advanceable pressure roller and the second contour tool is assigned a radially advanceable die, wherein the moveable contour segments of the first contour tool have convex portions for forming the ball raceways and the cage raceways of the preform and the moveable contour segments of the second contour tool have convex portions for forming the ball raceways and the cage raceways of the lower part forming a final molded body, and
- at least in the region of the first contour tool, a clamping element configured to non-rotationally clamp a round blank provided with a hub.

5. The device of claim 4, wherein the moveable contour segments abut in a gap-free manner against each other in a functional position.

6. The device of claim 4, wherein the moveable contour segments abut against a cone ring tapering in the direction of the hub, wherein the cone ring is axially movable.

7. The device of claim 6, wherein the moveable contour segments and guide surfaces of the cone ring have mutually corresponding guide elements, one of which is a sliding block and another is an undercut longitudinal groove.

8. The device of claim 6, wherein the moveable contour segment of the first contour tool is formed integrally with the cone ring in order to form the ball raceways.

9. The device of claim 6, wherein the cone ring is held axially displaceable and secured against rotation on a guide column.

10. The device of claim 9, wherein the guide column has a support and centering plate on its side facing the hub.

11. The device of claim 7, wherein the guide surfaces of at least the moveable contour segments of the second contour tool are formed as a bevel in the axial direction and have different inclinations.

12. The device of claim 11, wherein an angle of inclination of contour segments forming the ball raceway, relative to an axis, is greater than the inclination angle of contour segments forming the cage raceways.

13. The device of claim 12, wherein the die consists of a plurality of radially advanceable die parts as partial dies.

14. The device of claim 13, wherein each contour segment is assigned a die part.

15. The device of claim 6, wherein the moveable contour segments are held axially secured relative to the cone ring.

* * * * *